April 10, 1934.  A. G. LEONARD, JR  1,954,635
SHEET FORMING DEVICE
Filed Oct. 2, 1929   3 Sheets-Sheet 1
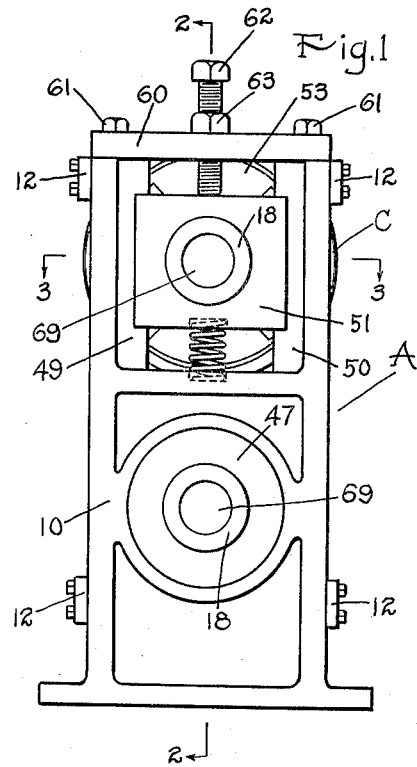
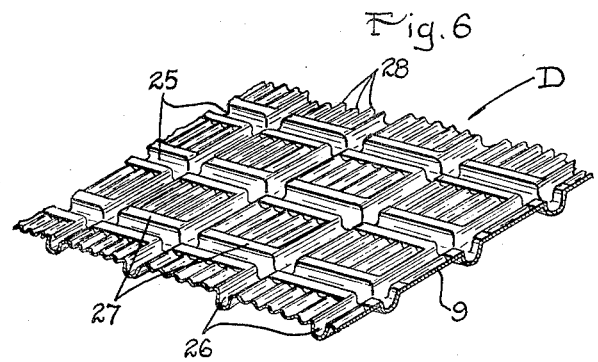
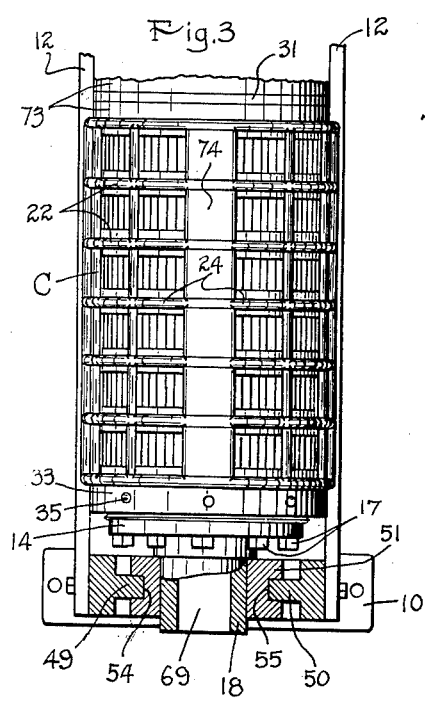
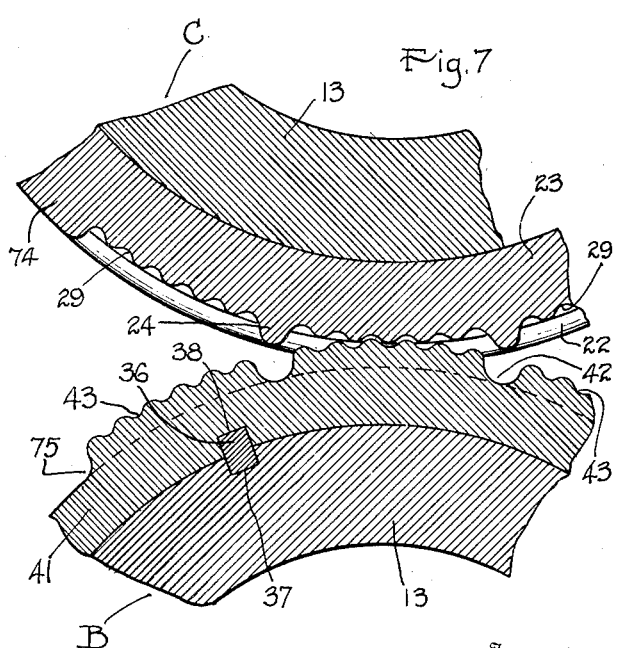
Inventor
Arthur G. Leonard Jr.
By Caswell & Jagaard
Attorneys

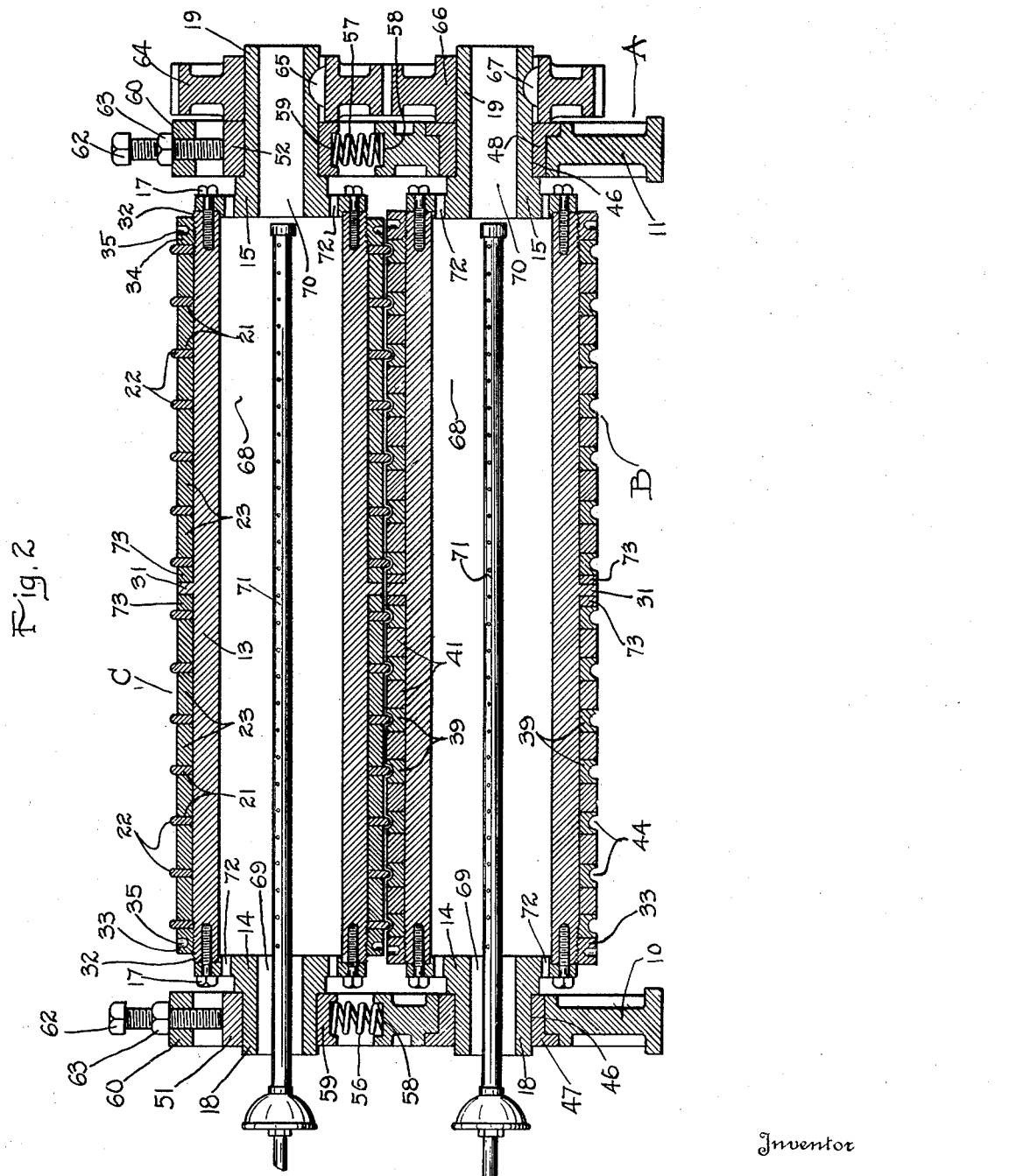

April 10, 1934.   A. G. LEONARD, JR   1,954,635
SHEET FORMING DEVICE
Filed Oct. 2, 1929   3 Sheets-Sheet 3

Inventor
Arthur G. Leonard Jr.
By Caswell & Fagaard
Attorneys

Patented Apr. 10, 1934

1,954,635

UNITED STATES PATENT OFFICE 1,954,635

SHEET FORMING DEVICE

Arthur G. Leonard, Jr., Wilmington, Ill., assignor to Orenda Corporation, Chicago, Ill., a corporation of Illinois Application October 2, 1929, Serial No. 396,717

5 Claims. (Cl. 18—10)

My invention relates to sheet forming devices and particularly to devices used for forming egg flats constructed with intersecting transverse and longitudinal grooves.

An object of the invention resides in providing a device including cylindrical male and female forming dies between which a sheet may be passed to form the egg flat therefrom.

Another object of the invention is to provide a cylindrical die which comprises a rotatable drum-like support and annular die sections removably clamped together thereon, which sections may be accurately and economically constructed individually and, which may be readily placed in position upon the drum.

A further object is to provide a pair of complemental dies constructed, as above noted, in which the meeting of the edges of the various die sections occurs in staggered planes, whereby the durability of the die structure is enhanced and the character of its work improved.

Another object of the invention resides in constructing alternate die sections on the male die with circumferential beads formed at intervals with short bead portions branching off therefrom, and in constructing the intervening die sections with beads transversely thereof adapted to be aligned with said short bead portions.

A still further object of the invention resides in providing the die sections having the transverse beads thereon with corrugations disposed between said beads and stopping short at their ends of the edges of said die sections to form blank marginal spaces adjacent the circumferential beads of the other die sections.

A still further object of the invention resides in constructing alternate die sections on the female die with annular grooves adapted to receive the circumferential beads on the male die sections, and with transverse grooves intersecting the annular grooves, and in constructing the intervening die sections with transverse grooves extending completely across the same and aligning with the transverse grooves in the first named die sections, said aligned transverse grooves being adapted to receive the transverse beads on said male die sections.

A feature of the invention resides in constructing said last named female die sections with corrugations disposed between the transverse grooves therein and extending completely across said die sections, said corrugations being adapted to intermesh with the corrugations of the male die sections.

Another object of the invention resides in constructing the drums with centrally disposed thrust ribs and in threading the ends of said drums to receive rings for clamping the die sections together upon said drums, between said rings and ribs.

With the foregoing and other objects in view, which will appear in the following description, the invention resides in the novel combination and arrangement of parts and in the details of construction hereinafter described and claimed.

In the drawings:

Fig. 1 is an end elevational view of a sheet forming device illustrating an embodiment of my invention.

Fig. 2 is an elevational sectional view of the device taken on line 2—2 of Fig. 1.

Fig. 3 is a fragmentary plan sectional view of the device taken substantially on line 3—3 of Fig. 1.

Fig. 6 is a perspective view of a portion of an egg flat constructed by my sheet forming device.

Fig. 7 is a fragmentary detail view in section of portions of the male and female dies showing the relation of one thereof with respect to the other.

Figure 5:
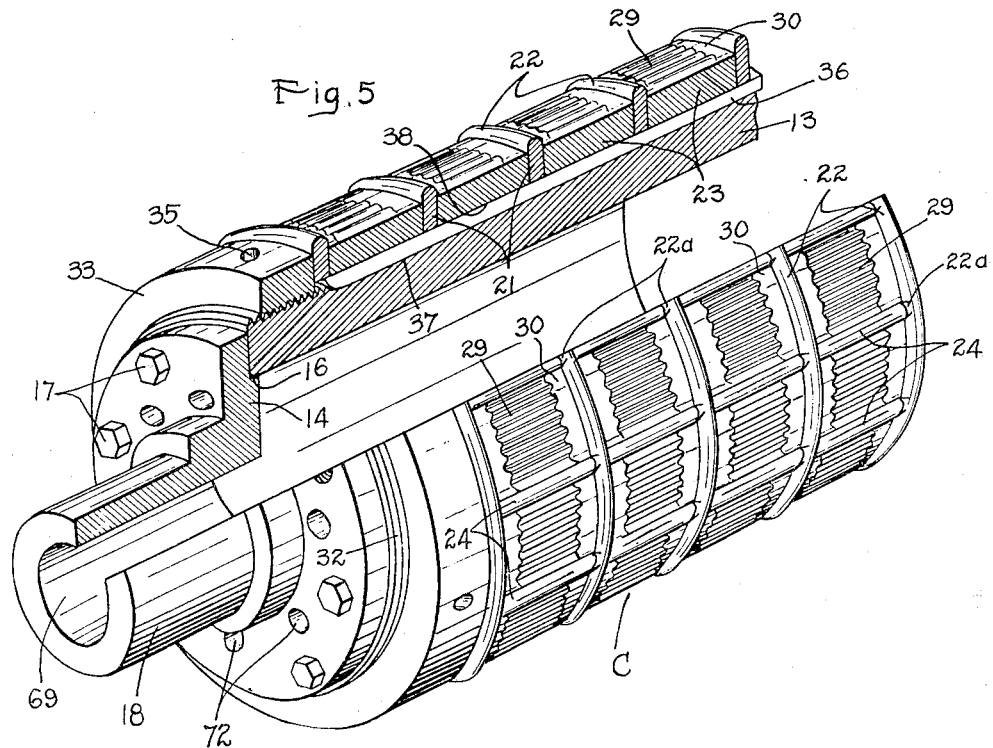
Fig. 5 is a similar view of the male cylindrical die.

My improved sheet forming device is designed principally for constructing egg flats for separating layers of eggs in egg boxes or cartons, and, particularly, such egg flats as are constructed with intersecting transverse and longitudinal grooves for receiving the edges of the dividers and holding them in proper position, and are provided with cushioning portions for supporting the eggs in a manner to reduce the breakage thereof. A portion of one such egg flats is shown in Fig. 6, the same being indicated in its entirety by the reference letter D. This egg flat is constructed from a sheet 9 and is formed with a plurality of longitudinally disposed grooves 25 which are intersected by a corresponding number of transverse grooves 26 forming squares 27 therebetween and upon which the ends of the eggs rest when the egg flats are placed within the egg box or carton. These squares, in the form of the egg flat shown, are corrugated, as indicated at 28, to cushion the ends of the eggs so as to prevent injury thereto in the handling of the box or carton.

My invention comprises a frame structure indicated in its entirety at A, which consists of two end frame members 10 and 11 connected one to the other by means of longitudinal bars 12 bolted thereto. The end frame members 10 and 11 are preferably constructed as castings and they rotatably support a cylindrical female die B and a cylindrical male die C in position superimposing said die B.

The cylindrical male die C is shown in detail in Figs. 2 and 5 and comprises primarily a hollow drum 13 which has attached to it, at the two ends thereof, end plates 14 and 15. These end plates are formed at their inner faces with annular shoulders 16, which snugly fit within the ends of the drum 13 and center said plates relative to said drum. A number of bolts 17, passing through the end plates 14 and 15 and screwed into the ends of the drum 13, rigidly secure the end plates and drums together. Said end plates 14 and 15 are formed with trunnions 18 and 19, which rotatably support said drum in a manner presently to be described, and are also constructed with annular end thrust shoulders 20, which hold the die in proper position longitudinally. The male die C includes a plurality of alternately disposed annular die sections 21 and 23, which may be slipped upon the drum 13, in their proper order, from both ends of said drum. The die sections 21 are comparatively narrow and each provides, at is circumference, a groove forming bead portion 22, which, at intervals, has opposed bead portions 22ᵃ branching off therefrom, the distance between the ends of each pair of said opposed bead portions being equal to the thickness of the body of the die section 21 of which they form a part. The die sections 23 are comparatively wide, each being formed at intervals with longitudinal bead portions 24, the ends of which abut against the ends of the bead branches 22ᵃ of the die sections 21. When the die sections 21 and 23 are alternately arranged upon the drum 13, the said sections form a series of intersecting beads or protrusions which are equally spaced in both directions to form the intersecting grooves 25 and 26 of the finished egg flat D.

The corrugations 28 upon the squares 27 of the egg flat (Fig. 6) are formed by means of a number of corrugations 29 (Fig. 5) on the die sections 23, which corrugations stop short of the edges of said dies to provide marginal portions 30 between the ends of said corrugations and the adjoining beads 22, which marginal portions serve to prevent a sheet from being torn or broken during the forming process.

For the purpose of clamping the various die sections 21 and 23 upon the drum 13, said drum is constructed midway of the ends thereof with an annular thrust rib 31, preferably integral with the drum. The die sections are applied in their proper order to the drum from both ends thereof and are moved along the drum toward the said thrust rib 31. The two ends of the drum 13 are externally threaded, as indicated at 32, to receive two internally threaded clamping rings 33 and 34. These rings are constructed with radial holes 35 for the reception of a spanner wrench, by means of which said rings may be rotated and advanced along the threads 32 to force the die sections 21 and 23 against one another and against the thrust rib 31 and thus clamp said die sections rigidly upon the drum. Rotational movement of the die sections 21 and 23 is prevented by means of a key 36 lodged within a key way 37 in drum 13, and in key ways 38 in the respective die sections.

Figure 4:
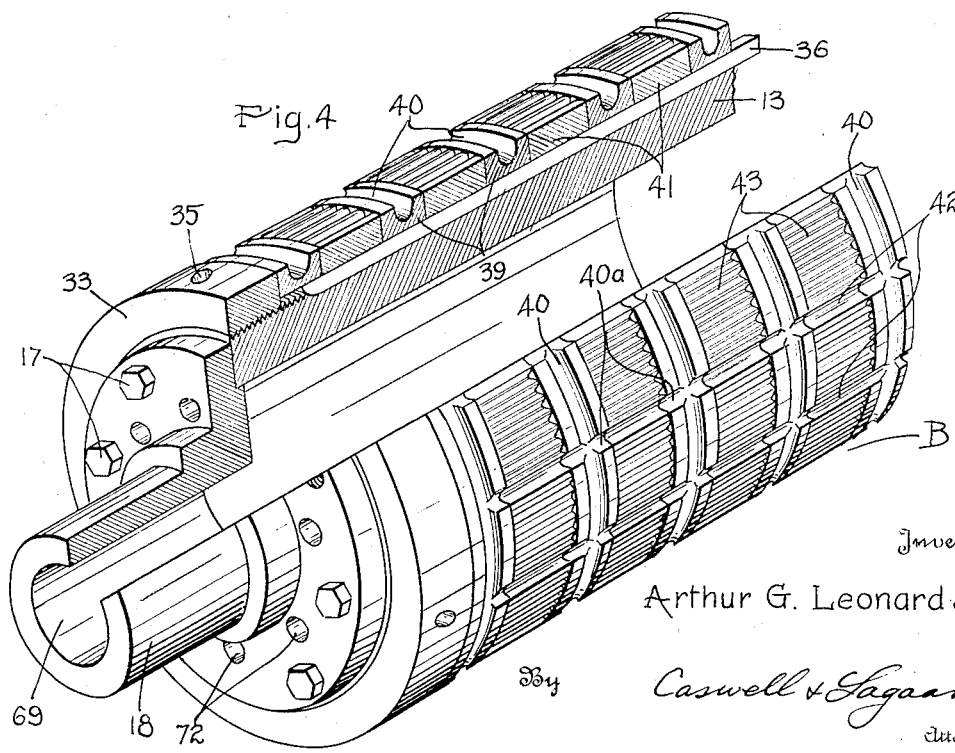
Fig. 4 is a fragmentary perspective view in detail of the female cylindrical die.

The supporting structure of the female die B is similar to the supporting structure for the male die C which I have hereinbefore described, and it will suffice to use similar reference characters to designate similar parts. The only substantial difference between the die B and the die C lies in the formation of the annular sections included therein. In the construction of the female die B (Figs. 2 and 4), a number of spaced annular die sections 39 are employed, which are formed with annular grooves 40 adapted to receive the beads 22 of the die sections 21. Disposed between said die sections 39 are other die sections 41, which correspond with the die sections 23 of the male die C and which are formed with grooves 42 corresponding to the beads 24 of the male die sections 23. These die sections 41 are further constructed with corrugations 43 which correspond to the corrugations 29 of the male die sections 23 and cooperate therewith to form the corrugations 28 (Fig. 6) on the egg flat D. Each female die section 43 is of the same width as the corrugated portions 29 of the corresponding male die section 23 and, having such dimension in width, is readily machined. Each female die section 39 is equal in width to the combined width of the corresponding male die section 21 and the width of the two marginal portions 30 of the male die sections 23 adjacent such male die section 21. Thus proportioned, the female die sections 39 have sufficient stock for the formation of the grooves 40 therein, it being necessary, of course, to cut branch grooves 40ᵃ in said die sections 39 for alignment with the grooves 42 in the die sections 41 and to accommodate the branch ribs 22ᵃ of the male die sections 21 and the end portions of the ribs 24 of the male die sections 23. The female die sections 39 and 41 are held against relative rotational movement on the drum by means of a key 36 and are clamped against the thrust rib 31 by means of annular clamping rings 33, the same as in the male die.

The method of journalling the dies B and C can best be seen in Figs. 1, 2 and 3. The end frame members 10 and 11 are bored at 46, near the lower portions thereof, to receive bushings 47 and 48, which form bearings for the trunnions 18 and 19 of the die B. The trunnions 18 and 19 of the die C are journalled in movable bearing blocks 51 and 52, which are received within openings 53 formed in the end frame members 10 and 11, of the frame structure A, immediately above the bushings 47 and 48 and extending through the upper part thereof. The frame members 10 and 11 are constructed with guides 49 and 50 within the openings 53, which guides are received within grooves 54 and 55 formed in the bearing blocks 51 and 52 and serve to slidably support the said bearing blocks in a manner to permit of the movement of the same toward and from the bushings 47 and 48, thus permitting of the adjustment of the distance between the two cylindrical dies B and C. These dies are normally held apart by means of a pair of compression coil springs 56 and 57, which are seated in sockets 58 formed in the end frame members 10 and 11, and in corresponding sockets 59 formed in the bearing blocks 51 and 52. By applying pressure to the upper portions of the bearing blocks 51 and 52, said blocks may be forced downwardly toward the bushings 47 and 48 in opposition to the springs 56 and 57 to vary the distance between the dies B and C.

For the purpose of maintaining the dies B and C in relatively adjusted position, each of the frame members 10 and 11 is provided with a bar 60 resting upon the upper ends of said frame members and closing the openings 53 therein.

These bars are rigidly attached to said frame members by means of bolts 61 screwed into the portions of said frame members forming the guides 49 and 50. Centrally disposed with respect to the openings 53 in the frame members 10 and 11, are adjusting screws 62, which are screwed into the bars 60 in a manner to engage the upper ends of the bearing blocks 51 and 52. By turning these screws in one direction, the bearings 51 and 52 may be forced toward the bushings 47 and 48 in opposition to springs 56 and 57, and by turning said screws in the opposite direction, reverse movement of said bearings may be had through the action of said springs. Thus, the distance between the two dies may be quickly and accurately adjusted at will. The adjusting screws 62 may be held in locked position by means of lock nuts 63 threaded upon said adjusting screws and adapted to seat against the bars 60.

The two dies B and C are driven in opposite directions and feed the sheet between them as the sheet is being formed. The trunnions 19 of the said die members B and C extend outwardly beyond the bearings 52 and 48, as best shown in Fig. 2. Mounted upon the trunnion 19 of die C and secured thereto by a key 65 is a spur gear 64 which meshes with a corresponding spur gear 66 similarly keyed upon the trunnion 19 of die B by a key 67. Gears 64 and 66 have the same pitch diameter as their respective dies and said dies run in opposite directions, and at the same rate of speed. This has the effect of causing the various beads and grooves and corrugations on the two die members always to occupy the proper relative position with respect to one another in the rotation of the dies (Fig. 7). Said dies B and C may be driven through any suitable gearing in train with either gear 64 or 66 or may be driven in any other suitable manner.

In the use of my invention, I find it desirable to moisten the stock before running it through the dies and to heat the dies so as to dry the formed sheet as it passes through the device. The trunnions 18 and 19 are respectively formed with longitudinal bores 69 and 70 which communicate with the chambers 68 within the hollow drums 13. Gas burners 71 inserted through the bores 69 of the trunnions 18 extend into the chambers 68 and the flames from said burners heat said drums 13 from the interior thereof. The gases from the burners are discharged from the chambers 68 and fresh air admitted thereto through a number of ports 72 formed in the end plates 14 and 15 and through the bores 69 and 70 of the trunnions 18 and 19.

In the formation of the egg flats, I find it preferable to construct two flats side by side from stock of double width. For this purpose, two blank rings 73 are placed adjacent the thrust rib 31 of each die. This construction provides sufficient marginal stock along the center of the formed sheet where it is severed by suitable cutters, not shown. Marginal spaces are preferably left between successively formed areas along the strip of stock and I find it preferable to construct the dies so as to form two successive egg flat portions for every revolution of the dies. Wherefore, I provide two diametrically opposed longitudinal projections 74 extending completely across the male die C, and corresponding longitudinal recesses 75 extending completely across the female die B. It will be understood, of course, that said projections 74 and recesses 75 consist of aligned projections on the individual male die sections and of aligned recesses in the individual female die sections.

The sheet or strips to be introduced to the dies B and C is preferably first formed with longitudinal grooves corresponding to the beads 22 of the male die C. Thus formed, the sheet or strip is then fed into the machine between the two dies B and C and is quickly and accurately shaped to provide both longitudinal and transverse grooves with the corrugations in the squares between said grooves. By applying the proper amount of heat to the drums 13, the stock may be set as it passes through the device and it will thereafter retain the desired form.

My invention is highly advantageous in that the simple and effective rotary die structure provided is capable of rapid and continuous operation in the shaping of the stock into the desired form. The dies, being made in sections, can be easily and accurately machined so as to form an accurate product without breakage or distortion of the stock. By constructing the dies in sections, they may be manufactured at relatively low cost and the various sections of the dies may be readily replaced when they become worn or broken. Further, by appropriate substitution, interchange or omission of the die sections, such die surfaces may be presented as will produce any desired product.

Changes in the specific form of my invention, as herein disclosed, may be made within the scope of what is claimed without departing from the spirit of my invention.

I claim:

1. A cylindrical die for forming sheets with intersecting grooves therein, said die comprising a drum, a set of die sections mounted upon said drum, each section being formed with an annular bead thereon, a second set of annular die sections having portions of smaller radius than the maximum radius of the bead and each formed with beads traversing the face thereof, said first and second named die sections being alternately disposed upon the drum, and means for clamping said die sections in place thereon.

2. A cylindrical die for forming sheets with intersecting grooves therein, said die comprising a drum, a set of annular die sections mounted upon the drum, each section being rounded transversely along the periphery thereof to provide an annular groove forming bead, a second set of annular die sections mounted upon the drum, and each having rounded beads traversing the face thereof the portions between said traversing beads being of smaller radius than said annular beads, said first and second named die sections being alternately disposed upon the drum, each of said first named die sections being formed with transverse bead portions branching off from its annular bead, said transverse bead portions being adapted to be aligned with and to abut, end to end, against the beads on said second named die sections, and means for clamping said die sections together and to the drum.

3. In combination, a cylindrical male die and a complemental cylindrical female die, each comprising a drum and sets of annular die sections mounted edge to edge thereon, the sections of one set alternating with the sections of the other set, each male die section of one set being relatively narrow and providing a circumferential bead, each male die section of the second set being relatively wide and formed with beads traversing the face thereof from edge to edge and also formed between the transverse beads with a corrugated portion, the ends of the corrugations stopping short of the edges of the section to provide smooth marginal portions at the periphery thereof, each female die section of one set being wider than the corresponding male die section and formed with intersecting circumferential and transverse grooves, the former for receiving the circumferential bead of said male die section and the latter for receiving the end portions of the transverse beads of the adjacent male die sections, each female die section of the second set being narrower than its corresponding male die section and formed with transverse grooves for receiving the medial portions of the beads on said male die section and also having portions of its face between said grooves corrugated to correspond with the corrugated portions of its complemental male die section, both said transverse grooves and corrugations extending from edge to edge of said female die section.

4. A cylindrical die for forming sheets with intersecting grooves therein, said die comprising a drum, a set of annular die sections mounted upon the drum, each section being rounded transversely along the periphery thereof to provide an annular groove forming bead, a second set of annular die sections mounted upon the drum, and each having rounded beads traversing the face thereof, the portions between said traversing beads being of smaller radius than said annular beads, said first and second named die sections being alternately disposed upon the drum, and means for clamping said die sections together and to the drum.

5. A cylindrical die for forming sheets with grooves extending in perpendicular directions therein, said die comprising a drum, a set of annular die sections mounted upon the drum, each section including an annular groove forming bead, a second set of annular die sections mounted upon the drum, and each having beads traversing at least a part of the face thereof, the portions between said traversing beads forming depressions which are laterally open except for adjoining sections and which, throughout the width of the face, are of smaller radius than said annular beads, said first and second named die sections being alternately disposed upon the drum, and means for clamping said die sections together and to the drum.

ARTHUR G. LEONARD, Jr.